(12) United States Patent
Weigl

(10) Patent No.: US 7,393,187 B2
(45) Date of Patent: Jul. 1, 2008

(54) DIAPHRAGM PUMP WITH INTEGRATED PRESSURE SENSOR

(75) Inventor: Manfred Weigl, Sinzing (DE)

(73) Assignee: Argillon GmbH, Redwitz (DE)

( * ) Notice: Subject to any disclaimer, the term of this patent is extended or adjusted under 35 U.S.C. 154(b) by 743 days.

(21) Appl. No.: 10/823,227

(22) Filed: Apr. 12, 2004

(65) Prior Publication Data

US 2004/0191093 A1    Sep. 30, 2004

Related U.S. Application Data

(63) Continuation of application No. PCT/DE02/04379, filed on Nov. 28, 2002.

(30) Foreign Application Priority Data

Dec. 12, 2001 (DE) .............................. 101 61 132

(51) Int. Cl.
F04B 17/00 (2006.01)
(52) U.S. Cl. .................. 417/413.1; 92/130 C
(58) Field of Classification Search ................. 417/417, 417/413.1, 540, 541, 542, 543; 92/5 R, 130 R, 92/130 C See application file for complete search history.

(56) References Cited

U.S. PATENT DOCUMENTS

| 3,411,704 | A | * | 11/1968 | Hilgert et al. ............... 417/280 |
| 3,939,758 | A | * | 2/1976 | Faisandier ........................ 92/1 |
| 5,554,013 | A | * | 9/1996 | Owens et al. ............ 417/413.1 |
| 6,082,102 | A | | 7/2000 | Wissler et al. |
| 6,110,410 | A | | 8/2000 | Owens et al. |
| 6,162,028 | A | * | 12/2000 | Rembold ................. 417/413.1 |
| 6,519,935 | B2 | | 2/2003 | Weigl |
| 2003/0140703 | A1 | | 7/2003 | Weigl |

FOREIGN PATENT DOCUMENTS

| DE | 197 43 337 C1 | 1/1999 |
| JP | 2001-203196 | 7/2001 |
| WO | 01/06098 A1 | 1/2001 |
| WO | 01/57488 A1 | 8/2001 |

* cited by examiner

Primary Examiner—Devon Kramer
Assistant Examiner—Vikansha Dwivedi
(74) Attorney, Agent, or Firm—Laurence A. Greenberg; Werner H. Stemer; Ralph E. Locher

(57) ABSTRACT

A diaphragm pump includes a pressure sensor disposed in the housing thereof, and which is used as an expansion tank for protecting the pressure sensor. To avoid excess pressure on the pressure sensor, the pressure sensor membrane is directly disposed in the pump head, i.e., above the pump membrane of the diaphragm pump, such that the increase in volume of the reducing agent during the freezing of the reducing agent inside the diaphragm pump is detected by deflection of the pump membrane against the force of a spring, and the pressure sensor membrane is protected from damage.

20 Claims, 2 Drawing Sheets

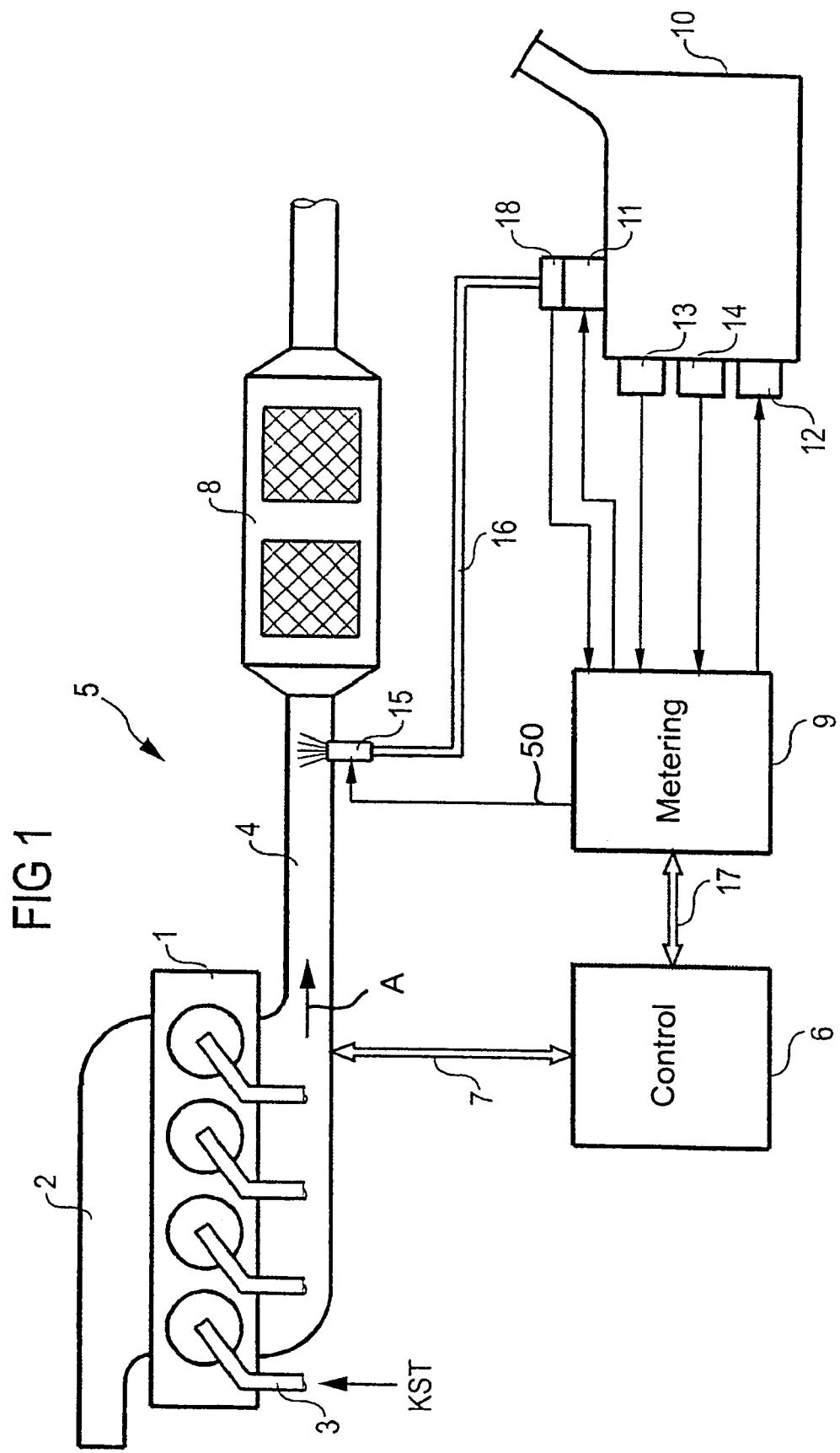

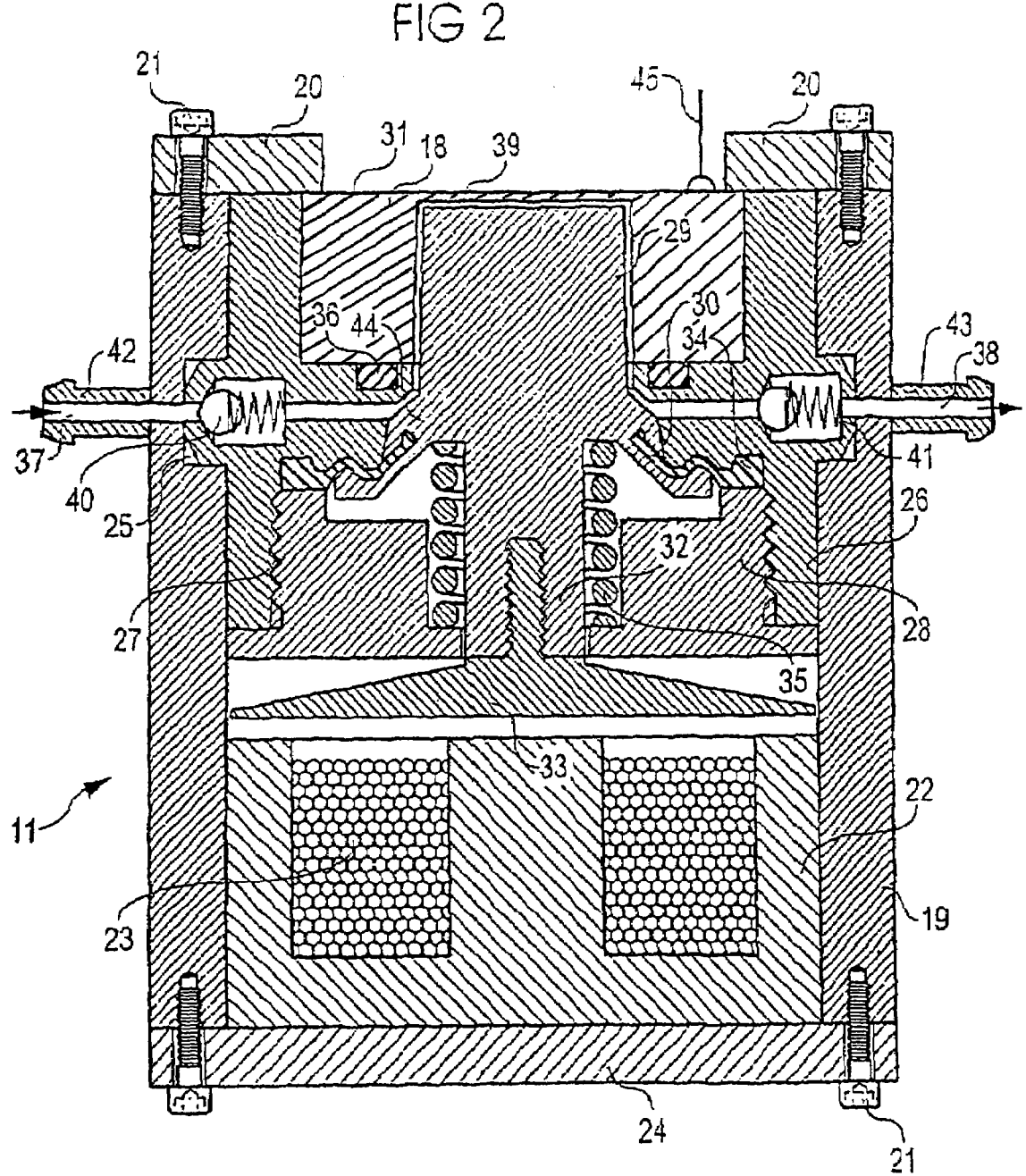

DIAPHRAGM PUMP WITH INTEGRATED PRESSURE SENSOR

CROSS-REFERENCE TO RELATED APPLICATION

This application is a continuation of copending International Application No. PCT/DE02/04379, filed Nov. 28, 2002, which designated the United States.

BACKGROUND OF THE INVENTION

Field of the Invention

The invention relates to a diaphragm pump with integrated pressure sensor for recording the pressure of a reducing agent solution for the exhaust-gas aftertreatment in an internal combustion engine.

The nitrogen oxide emissions from an internal combustion engine that operates with excess air, in particular, a diesel engine, can be lowered with the aid of the selective catalytic reduction (SCR) method so as to form nitrogen and water vapor. The reducing agent used is either gaseous ammonia ($NH_3$), ammonia in aqueous solution, or urea in aqueous solution. The urea serves as an ammonia carrier and is injected into the exhaust system with the aid of a metering system upstream of a hydrolysis catalytic converter, where it is converted into ammonia by hydrolysis, and the ammonia then, in turn, reduces the nitrogen oxide in the actual SCR or deNOx catalytic converter.

The main components of such a metering system include a reducing-agent tank, a pump, a pressure regulator, a pressure sensor, a metering valve, and the required connecting hoses. The pump conveys the reducing agents stored in the reducing-agent tank to the metering valve, by which the reducing agent is injected into the exhaust-gas stream upstream of the hydrolysis catalytic converter. The metering valve is actuated by signals from a control device such that a defined, currently required quantity of reducing agent is supplied as a function of operating parameters of the internal combustion engine German Patent DE 197 43 337 C1, corresponding to U.S. Pat. No. 6,082,102 to Wissler et al.

One advantage of the ammonia-releasing substances that are present in aqueous solutions, such as, for example, urea, is that, in technical terms, it is relatively simple to solve the problems of storing, handling, carrying, and metering these substances. One drawback of these aqueous solutions is that there is a risk of them freezing at certain temperatures that are dependent on the concentration of the dissolved substance.

32% strength urea solution, as is typically used as reducing agent in SCR systems, has a freezing point of −11° C. When it freezes, the volume rises by approx. 10%, in a similar way to water. This increase in volume is compensated for primarily by the elastic reducing-agent hose, i.e., the increase in pressure is limited by the elasticity of the system. All components of the system that contain reducing agent have to be configured such that the increase in volume can be compensated for or a pressure drop toward the hose is possible until complete freezing occurs. This requires a high excess-pressure resistance and small dead volumes in the components. In the case of the pressure sensor, the ability to withstand pressure is, in principle, limited by the pressure-sensor diaphragm. The further the bursting pressure of the pressure sensor diaphragm lies above the upper measuring limit of the pressure sensor, the lower the sensor sensitivity and, therefore, the measured value resolution and accuracy. To protect the pressure sensor in urea SCR systems of this nature in the event of the volume of liquid freezing, therefore, it has to be ensured that the expansion of the urea solution when it changes into the solid phase does not lead to an uncontrolled pressure rise in the metering system. In particular, the pressure sensor has to be protected because, in principle, it represents a pressure-sensitive component.

International Publication WO 01/57488 A1, corresponding to United States Patent Publication No. 2003/140703A1 to Weigl, has described a pressure-sensor for recording the pressure of a liquid, in particular, of a reducing agent solution, which is constructed such that the volume of reducing agent that is starting to freeze directly at the sensor diaphragm and in the connecting well leading to the reducing-agent metering system does not destroy the sensor. To such an end, the pressure sensor element, which includes a pressure sensor diaphragm, is held in a defined position in a holding part by a spring element during operation within a permissible working-pressure range. If the permissible working-pressure range is exceeded, a relative movement counter to the spring force takes place between the pressure sensor element and the holding part. Such movement results in an increase in the volume of the space lying directly in front of the pressure sensor diaphragm so that the pressure is limited and the pressure sensor diaphragm is effectively protected in the event of liquid freezing.

On account of the low buffer capacity, such a method cannot be used to prevent a rise in pressure in the overall system before the sensor freezes. For example, depending on the particular application, it may be necessary for additional elements, such as spring-loaded diaphragms or elastic walls, to be provided in the pressure system.

One of the preferred types of pumps for reducing-agent metering systems is the diaphragm pump. The drive for such a pump can be configured such that, in the intake stroke, an electromagnet retracts the pump diaphragm counter to the force of a spring, and the pumping or delivery stroke is carried out by the spring. The pump cycle is predetermined by the control unit of the metering system as set forth in the following text.

When the system is starting up, the electromagnet is energized with a current pulse of defined length (depending on the instantaneously available supply voltage) by a suitable circuit breaker. As a result, a pumping cycle including intake and delivery strokes is carried out as described above. The operation is repeated until a predetermined maximum pressure is reached. Renewed pumping cycles are only commenced again when the pressure has dropped below a predetermined minimum. The pressure sensor is needed for this type of electronic pressure control. With this type of diaphragm pump, the maximum pressure is fundamentally predetermined by the spring force. Because the at-rest position of the diaphragm is at the end of the delivery stroke, the diaphragm can compensate for the increase in the volume of the reducing agent in the diaphragm pump in the event of it freezing by its full stroke volume and can, thereby, limit the increase in volume in the diaphragm pump. Because the dead volume in the at-rest position is already minimized by virtue of optimization of the intake capacity, it is not possible for an excess pressure to form in the pump head under any circumstances. In existing systems, this fundamental pressure storage capacity of the pump cannot be used to protect the pressure sensor because the pump outlet valve, which is configured as a simple non-return valve, prevents pressure compensation in the direction of the pump diaphragm. Even with a special valve that could be controlled or equipped with a pressure-relief valve in the opposite direction, it is not possible to ensure reliable pressure compensation with certain temperature distributions in the event of this system freezing.

SUMMARY OF THE INVENTION

It is accordingly an object of the invention to provide a diaphragm pump with integrated pressure sensor that overcomes the hereinafore-mentioned disadvantages of the heretofore-known devices of this general type and that, in the event of the liquid reducing agent freezing, prevents the pressure sensor, in particular the pressure sensor diaphragm, from being damaged.

With the foregoing and other objects in view, there is provided, in accordance with the invention, diaphragm pump for delivering liquid reducing agent to an exhaust-gas aftertreatment installation of an internal combustion engine, including a pump casing having a base and defining an inlet passage and an outlet passage, a central support body disposed in the casing, a spring disposed in the casing and imparting a force against the central support body, a pump diaphragm disposed in the casing to define a reducing agent chamber thereabove with respect to the base and having two limit positions, a first side secured to the pump casing, and a second side secured to the central support body, an electromagnet disposed at the base and operatively connected to the pump diaphragm to move the pump diaphragm to and fro with respect to the central support body between the limit positions counter to the force of the spring upon actuation of the electromagnet, a non-return inlet valve fluidically connected to the inlet passage for supplying reducing agent to the reducing agent chamber, a non-return outlet valve fluidically connected to the outlet passage for discharging the reducing agent, and a pressure sensor connected to the pump casing and having a pressure sensor diaphragm, the pressure sensor diaphragm sensing a pressure of the reducing agent in the pump casing above the pump diaphragm and being disposed to have the pump diaphragm absorb an increase in volume of the reducing agent when the reducing agent freezes inside the reducing agent chamber by the pump diaphragm deviating counter to the force of the spring.

The idea on which the invention is based lies in disposing the pressure sensor in the casing of the diaphragm pump and using the diaphragm pump as an expansion vessel to protect the pressure sensor.

Therefore, to avoid excess pressure at the pressure sensor, the pressure sensor diaphragm is disposed directly in the pump head, i.e., above the diaphragm of the diaphragm pump, so that the increase in the volume of the reducing agent that occurs in the event of the reducing agent freezing inside the diaphragm pump is absorbed by a deviation in the pump diaphragm counter to the force of a spring to protect the pressure sensor diaphragm from damage.

In accordance with another feature of the invention, the electromagnet has an armature plate, the central support body has an end facing the electromagnet and a drive shaft at the end facing the electromagnet, and the armature plate is disposed at the end of the drive shaft.

In accordance with a further feature of the invention, the armature plate is connected to the drive shaft by a connection selected from the group consisting of an adhesive bond, a weld, a press-fit, and a screw connection.

In accordance with an added feature of the invention, the pressure sensor defines a cup-shaped recess, the central support body has a cylindrical end remote from the electromagnet, the cylindrical end has a surface remote from the electromagnet, the cylindrical end projects into the cup-shaped recess to form a gap between the recess and the surface, and the gap fluidically connects the inlet passage to the outlet passage.

In accordance with an additional feature of the invention, the support body has a flange, the second side of the pump diaphragm is fixedly connected to the flange, and the first side is fixedly connected to the pump casing.

In accordance with yet another feature of the invention, the casing is of a metallic material having high thermal conductivity, in particular, aluminum. The thermal conductivity is for example >100 W m$^{-1}$k$^{-1}$ and especially around 200 W m$^{-1}$k$^{-1}$.

In accordance with yet a further feature of the invention, the spring is disposed between the base and the central support body.

In accordance with yet an added feature of the invention, the spring imposes the force against the central support body in a direction away from the base.

With the objects of the invention in view, there is also provided a diaphragm pump for delivering liquid reducing agent to an exhaust-gas aftertreatment installation of an internal combustion engine, including a pump casing having a base and defining an inlet passage and an outlet passage, a central support body disposed in the casing, a spring disposed in the casing and imparting a force against the central support body, a pump diaphragm disposed in the casing to define a reducing agent chamber thereabove with respect to the base and having two limit positions, a first side secured to the pump casing, and a second side secured to the central support body, an electromagnet disposed at the base and operatively connected to the central support body to move the central support body and, thereby, the pump diaphragm to and from between the limit positions counter to the force of the spring upon actuation of the electromagnet, a non-return inlet valve fluidically connected to the inlet passage for supplying reducing agent to the reducing agent chamber, a non-return outlet valve fluidically connected to the outlet passage for discharging the reducing agent, and a pressure sensor connected to the pump casing and having a pressure sensor diaphragm, the pressure sensor diaphragm recording a pressure of the reducing agent in the reducing agent chamber, the pump diaphragm deviating counter to the force of the spring to absorb an increase in volume of the reducing agent when the reducing agent freezes inside the reducing agent chamber.

Other features that are considered as characteristic for the invention are set forth in the appended claims.

Although the invention is illustrated and described herein as embodied in a diaphragm pump with integrated pressure sensor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a fragmentary, block diagram schematically illustrating an internal combustion engine with an associated exhaust-gas aftertreatment installation in which the device according to the invention is used; and FIG. 2 is a cross-sectional view through a diaphragm pump with integrated pressure sensor according to the invention.

DESCRIPTION OF THE PREFERRED EMBODIMENTS

Referring now to the figures of the drawings in detail and first, particularly to FIG. 1 thereof, there is shown a highly simplified version of an internal combustion engine operated with excess air and having an associated exhaust-gas aftertreatment installation in the form of a block diagram. FIG. 1 illustrates only those parts that are required to gain an understanding of the invention. In particular, the fuel circuit has not been illustrated. The exemplary embodiment shows, as the internal combustion engine, a diesel engine, and the reducing agent used for the aftertreatment of the exhaust gas is aqueous urea solution.

The air required for combustion is fed to the internal combustion engine 1 through an intake line 2. An injection installation, which may be configured, for example, as a high-pressure storage injection installation (common rail) with injection valves that inject fuel KST directly into the cylinders of the internal combustion engine 1, is denoted by reference numeral 3. The exhaust gas from the internal combustion engine 1 flows through an exhaust pipe 4 to an exhaust-gas aftertreatment installation 5 and from the aftertreatment installation 5 through a non-illustrated muffler into the atmosphere.

To control the internal combustion engine 1, an engine control unit 6, which is known per se, is connected to the internal combustion engine 1 through a data and control line 7, which is only diagrammatically indicated in the figure. Signals from sensors (e.g., temperature sensors for intake air, charge air, coolant, load sensor, speed sensor) and signals for actuators (e.g., injection valves, control elements) are transmitted between the internal combustion engine 1 and the engine control unit 6 through the data and control line 7.

The exhaust-gas aftertreatment installation 5 includes a reduction catalytic converter 8, which includes a plurality of catalytic converter units that are connected in series and are not described in any more detail. In addition, in each case one non-illustrated oxidation catalytic converter may be disposed upstream and/or downstream of the reduction catalytic converter 8. Furthermore, there is a metering control unit 9, which is associated with a reducing-agent storage tank 10 having an electrically actuable reducing-agent pump 11 for delivering the reducing agent. The reducing-agent pump 11 is configured as a diaphragm pump.

The reducing agent used is aqueous urea solution that is stored in the reducing-agent storage tank 10. This tank 10 has an electric heater device 12 and sensors 13, 14 that record the temperature of the urea solution and the filling level in the reducing-agent storage tank 10. Moreover, the signals from a temperature sensor disposed upstream of the reduction catalytic converter 8 and an exhaust-gas measurement pick-up, e.g. a NOx sensor (not illustrated), disposed downstream of the reduction catalytic converter 8 are also transmitted to the metering control unit 9 (not illustrated).

The metering control unit 9 controls an electromagnetic metering valve 15, to which urea solution is fed on demand from the reducing-agent storage tank 10 through a feed line 16 with the aid of the reducing agent pump 11. A pressure sensor 18, which records the pressure in the metering system and emits a corresponding signal to the metering-control unit 9, is integrated in the reducing-agent pump 11. The injection of the urea solution by the metering valve 15 takes place into the exhaust pipe 4 upstream of the reduction catalytic converter 8.

When the internal combustion engine 1 is operating, the exhaust gas flows through the exhaust pipe 4 in the direction indicated by arrow A.

The metering control unit 9 is connected to the engine control unit 6 through an electrical bus system 17 for data transfer between the units. The operating parameters that are of relevance to the calculation of the quantity of urea solution to be metered, such as, for example, the engine speed, air mass, fuel mass, control displacement of an injection pump, exhaust-gas mass flow, operating temperature, charge-air temperature, start of injection, etc., are transmitted to the metering control unit 9 through the bus system 17.

Working on the basis of these parameters and the measured values for the exhaust-gas temperature and the NOx content, the metering control unit 9 calculates the quantity of urea solution to be injected and emits a corresponding electrical signal to the metering valve 15 through an electrical connecting line 50 (not shown in more detail). The injection into the exhaust pipe 4 hydrolyzes and thoroughly mixes the urea. The catalytic reduction of the NOx in the exhaust gas to form $N_2$ and $H_2O$ takes place in the catalytic converter units.

The metering valve 15 for introducing the urea solution into the exhaust pipe 4 substantially corresponds to a standard low-pressure gasoline injection valve that is releasably secured, for example, in a valve-holding device fixedly connected to the wall of the exhaust pipe 4.

Preferably, the metering control unit 9 is disposed directly at the reducing-agent storage tank 10 and forms a structural unit therewith.

FIG. 2 provides a more detailed illustration of the reducing-agent pump 11, configured as a diaphragm pump, with the integrated pressure sensor 18.

The diaphragm pump and the pressure sensor are accommodated in a common, multipart casing, which includes a casing part 19 that is configured in the form of a hollow cylinder, a casing base 24 and a casing cover 20 that is configured in the form of a ring. The casing part 19, the casing base 24, and the casing cover 20 are releasably connected to one another by screw connections 21, which are only diagrammatically indicated. An electromagnet, including a cup-shaped iron core 22 and an electrical winding 23 disposed therein, is-provided on the casing base 24. The winding 23 is energized by electrical pulses from the metering control unit 9 (FIG. 1) through non-illustrated electrical lines.

With respect to its longitudinal extent, the casing part 19 has, in the upper half, facing the casing cover 21, a radially encircling groove 25 on its inner surface, into which groove, after the diaphragm pump has been assembled, a correspondingly shaped projection on a pump upper part 26 comes to lie so that the pump upper part 26 is fixed in terms of its axial direction. At its free end facing the casing base 24, the pump upper part 26 has a screw thread 27 that interacts with the screw thread of a guide part 28. The diaphragm pump also includes a central support body 29 made from a material with a low relative density, for example, plastic, the support body extending in the axial direction and projecting, at its free end facing the casing cover 20, into a cup-shaped recess in the pressure sensor 18. The pressure sensor 18 includes a pressure sensor diaphragm 31, to which a network of resistors is applied, preferably, using thick-film technology; the network of resistors includes the sensor and calibration resistors. The measurement principle is based on the effect of the change in resistance in the event of a mechanical stress at the pressure sensor diaphragm (piezo resistivity). Additional temperature-dependent resistors may be provided for the purpose of compensating for temperature-dependent effects.

The network of resistors and the temperature-dependent resistors are connected to evaluation electronics, which are, preferably, integrated in the metering control unit 9, through connection pins and electrical connection lines 45.

On the side facing the casing base, the central support body 29 has a drive shaft 32, to the end side of which an armature plate 33 made from ferromagnetic material is secured and which can be moved by the electromagnet, which includes an iron core 22 and electrical winding 23. The connection between drive shaft 32 and armature plate 33 may be produced by adhesive bonding, welding, pressing or, as indicated in the figure, by a screw connection.

The support body 29 has a flange 44, into which the pump diaphragm 30 is injection-molded or pressed. The support body 29, therefore, introduces the driving forces into the pump diaphragm 30 and displaces undesired dead volume in the diaphragm volume; in particular, the cylindrical cavity in the cup-shaped pressure sensor element 31 is largely filled.

The outer edge of the pump diaphragm 30 is sealed in the pump upper part 26 by a sealing ring 34 formed integrally thereon. For such a purpose, an axial prestress is produced by the screw-in guide part 28. The guide part 28 is also responsible for guiding the drive shaft 32 and a coil spring 35, which is supported on one side against a collar of the guide part 28 and on the other side against a collar of the central support body 29, so that when the electromagnet is not excited the central support body 29 is in its at-rest position as a result of the prestressing of the coil spring 35. The pressure sensor element 31 is pressed into the pump upper part 26 by the casing parts 19, 20, 21, with an O-ring seal 36 acquiring a suitable prestress for sealing purposes.

Passages 37, 38, which lead through the casing part 19 and the pump upper part 26 toward the central support body 29 located above the pump diaphragm 30, are provided at the encircling groove 25 in the cylindrical casing part 19 for the purpose of supplying and discharging the reducing agent. The passages 37, 38 are flow-connected through the gap 39 between pressure sensor element 31 and central support body 29.

Chambers, which are not indicated in more detail and in which non-return valves 40, 41 are disposed, are provided in the passages 37, 38 within the pump upper part 26. These non-return valves 40, 41 in each case include, in the usual way, a ball and a spring element acting on the ball so that the corresponding passage is opened or closed under the influence of the movement of the pump diaphragm 30.

Outside the casing part 19, the passages 37, 38 end in connection pieces 42, onto which non-illustrated hose lines are fitted, one hose line leading through a filter to the reducing-agent storage tank and the other hose line leading to the metering valve. The direction of flow of the reducing agent through the diaphragm pump is indicated in the figure by arrow symbols.

The text that follows explains the function of the diaphragm pump with the integrated pressure sensor.

The armature plate 33 and, through the drive shaft 32, the central support body 29 are attracted by the electromagnet 22, 23, counter to the force of the coil spring 35, by a current pulse of defined length. This increases the volume above the pump diaphragm 30, and reducing agent is sucked into the pump upper part 26 through the connection piece 42, the passage 37, and the inlet valve 40, configured as a non-return valve. After the magnetic field in the electromagnet 22, 23 has dropped off, the coil spring 35 presses the central support body 29 back upward and, thereby, forces reducing agent into the reducing-agent line 16, toward the metering valve, through the outlet valve 41, which is configured as a non-return valve, the passage 38, and the connection piece 43.

Through the pressure sensor 18, the pressure in the pump upper part 26 can be measured by a control computer that is present in the metering control unit 9 during any phase of the pumping cycle. The pressure sensor is connected to the metering control unit 9 by the electrical connection lines 45.

If the reducing-agent metering system freezes, the outlet valve 41 prevents the possibility of an excess pressure forming in the pump upper part 26 as the reducing agent freezes in the hose. If the reducing-agent pump then also freezes, the increase in the enclosed reducing-agent volume is absorbed by the central support body 29 deviating counter to the force of the coil spring 35 so that the pressure is limited to a maximum level defined by the pump spring force. This maximum value is well below the bursting pressure of the pressure sensor, with a considerable safety margin. Specifically, the force of the coil spring 35 is appropriately dimensioned such that the system pressure required is reliably reached but is not significantly exceeded because this would impose unnecessarily high demands on the dimensioning of the electromagnet 22, 23 and on the electrical power consumption.

The electrical winding 23 is energized to thaw the reducing agent pump. As a result, the electromagnet is heated. The configuration of the pump casing, including casing part 19, casing base 24, and casing cover 20, from material with a good thermal conductivity, for example, aluminum, as well as the compact overall form of the diaphragm pump, means that the entire diaphragm pump is heated through the pump casing and the enclosed volume of reducing agent is, thereby, melted. The current is controlled by the control computer of the metering control unit 9 to a level that is below the attraction current of the electromagnet. This ensures that even a plurality of heating pulses when the diaphragm pump is already functional again do not lead to an undesired increase in pressure. Because the pressure sensor diaphragm 31, preferably, has its own heater, as is known, for example, from International Publication WO 01/06098 A1, corresponding to U.S. Pat. No. 6,519,935 to Weigl, a pressure signal that the control computer can use to determine whether or not the reducing-agent metering system and, in particular, the pump are functional again is available sufficiently quickly.

With such a configuration, a pressure offset is formed during a pressure measurement in the pumping phase on account of the resistance of the outlet valve. Because the closing force of the outlet valve is minimized to optimize the self-venting capacity of the diaphragm pump, the offset is low with respect to the measured value at the low flow velocity toward the end of the pumping stroke. Because, moreover, the pressure control is performed by the control unit in the urea SCR system described, the timing of the measurement can be synchronized with the pump actuation cycle and the offset can be taken into account during the pressure control.

Disposing the pressure sensor in the diaphragm pump results in additional diagnosis options. Pressure measurement in the intake stroke makes it possible to differentiate, in the event of the delivery capacity being too low, between the inlet having an excessively high flow resistance, a reduced pressure being present in the reducing-agent storage tank on account of incorrect ventilation, or whether or not air is being sucked in on account of a deficit of reducing agent.

I claim:

1. A diaphragm pump for delivering liquid reducing agent to an exhaust-gas aftertreatment installation of an internal combustion engine, comprising:
   a pump casing having a base and defining an inlet passage and an outlet passage;
   a central support body disposed in said casing;
   a spring disposed in said casing and imparting a force against said central support body;
   a pump diaphragm disposed in said casing to define a reducing agent chamber thereabove with respect to said base and having:
   two limit positions;
   a first side secured to said pump casing; and
   a second side secured to said central support body;
   an electromagnet disposed at said base and operatively connected to said pump diaphragm to move said pump diaphragm to and fro with said central support body between said limit positions counter to said force of said spring upon actuation of said electromagnet;
   a non-return inlet valve fluidically connected to said inlet passage for supplying reducing agent to said reducing agent chamber;
   a non-return outlet valve fluidically connected to said outlet passage for discharging the reducing agent; and
   a pressure sensor connected to said pump casing and having a pressure sensor diaphragm, said pressure sensor diaphragm sensing a pressure of the reducing agent in said pump casing above said pump diaphragm and being disposed to have said pump diaphragm absorb an increase in volume of the reducing agent when the reducing agent freezes inside said reducing agent chamber by said pump diaphragm deviating counter to said force of said spring;

said pressure sensor and said central support body defining a gap therebetween, said gap serving as a flow connection between said inlet passage and said outlet passage.

2. The diaphragm pump according to claim 1, wherein:
said electromagnet has an armature plate;
said central support body has:
an end facing said electromagnet; and
a drive shaft at said end facing said electromagnet; and
said armature plate is disposed at said drive shaft.

3. The diaphragm pump according to claim 2, wherein said armature plate is connected to said drive shaft by a connection selected from the group consisting of an adhesive bond, a weld, a press-fit, and a screw connection.

4. The diaphragm pump according to claim 1, wherein:
said pressure sensor defines a cup-shaped recess;
said central support body has a cylindrical end remote from said electromagnet;
said cylindrical end has a surface remote from said electromagnet;
said cylindrical end projects into said cup-shaped recess to form a gap between said recess and said surface; and
said gap fluidically connects said inlet passage to said outlet passage.

5. The diaphragm pump according to claim 1, wherein:
said support body has a flange;
said second side of said pump diaphragm is fixedly connected to said flange; and
said first side is fixedly connected to said pump casing.

6. The diaphragm pump according to claim 1, wherein said casing is of a metallic material having high thermal conductivity.

7. The diaphragm pump according to claim 6, wherein said casing is of aluminum.

8. The diaphragm pump according to claim 1, wherein said casing is of aluminum.

9. The diaphragm pump according to claim 1, wherein said spring is disposed between said base and said central support body.

10. The diaphragm pump according to claim 1, wherein said spring imposes said force against said central support body in a direction away from said base.

11. A diaphragm pump for delivering liquid reducing agent to an exhaust-gas aftertreatment installation of an internal combustion engine, comprising:
a pump casing having a base and defining an inlet passage and an outlet passage;
a central support body disposed in said casing;
a spring disposed in said casing and imparting a force against said central support body;
a pump diaphragm disposed in said casing to define a reducing agent chamber thereabove with respect to said base and having:
two limit positions;
a first side secured to said pump casing; and
a second side secured to said central support body;
an electromagnet disposed at said base and operatively connected to said central support body to move said central support body and, thereby, said pump diaphragm to and fro between said limit positions counter to said force of said spring upon actuation of said electromagnet;
a non-return inlet valve fluidically connected to said inlet passage for supplying reducing agent to said reducing agent chamber;
a non-return outlet valve fluidically connected to said outlet passage for discharging the reducing agent; and
a pressure sensor connected to said pump casing and having a pressure sensor diaphragm, said pressure sensor diaphragm sensing a pressure of the reducing agent in said reducing agent chamber, said pump diaphragm deviating counter to said force of said spring to absorb an increase in volume of the reducing agent when the reducing agent freezes inside said reducing agent chamber;

said pressure sensor and said central support body defining a gap therebetween, said gap serving as a flow connection between said inlet passage and said outlet passage.

12. The diaphragm pump according to claim 1, wherein:
said electromagnet has an armature plate;
said central support body has:
an end facing said electromagnet; and
a drive shaft at said end facing said electromagnet; and
said armature plate is disposed at said drive shaft.

13. The diaphragm pump according to claim 12, wherein said armature plate is connected to said drive shaft by a connection selected from the group consisting of an adhesive bond, a weld, a press-fit, and a screw connection.

14. The diaphragm pump according to claim 11, wherein:
said pressure sensor defines a cup-shaped recess;
said central support body has a cylindrical end remote from said electromagnet;
said cylindrical end has a surface remote from said electromagnet;
said cylindrical end projects into said cup-shaped recess to form a gap between said recess and said surface; and
said gap fluidically connects said inlet passage to said outlet passage.

15. The diaphragm pump according to claim 11, wherein:
said support body has a flange;
said second side of said pump diaphragm is fixedly connected to said flange; and
said first side is fixedly connected to said pump casing.

16. The diaphragm pump according to claim 11, wherein said casing is of a metallic material having high thermal conductivity.

17. The diaphragm pump according to claim 16, wherein said casing is of aluminum.

18. The diaphragm pump according to claim 11, wherein said casing is of aluminum.

19. The diaphragm pump according to claim 11, wherein said spring is disposed between said base and said central support body.

20. The diaphragm pump according to claim 11, wherein said spring imposes said force against said central support body in a direction away from said base.

* * * * *